United States Patent [19]
Hoff et al.

[11] Patent Number: 5,579,719
[45] Date of Patent: Dec. 3, 1996

[54] METHOD AND MEANS FOR QUASI AD-LIBITUM FEEDING FOR GESTATION SOWS IN LOOSE HOUSING

[75] Inventors: Steven J. Hoff; Mark S. Honeyman; James D. McKean; Emmett J. Stevermer; Dwaine S. Bundy; Fernando Perez-Munoz, all of Ames, Iowa; Steven E. Bryce, Souderton, Pa.; William E. Backhaus, Ida Grove, Iowa

[73] Assignee: Iowa State University Research Foundation, Inc., Ames, Iowa

[21] Appl. No.: 418,006

[22] Filed: Apr. 6, 1995

[51] Int. Cl.⁶ ..................................... A01K 5/00
[52] U.S. Cl. ........................ 119/51.02; 119/842
[58] Field of Search ................ 119/51.02, 840, 119/842

[56] References Cited

U.S. PATENT DOCUMENTS

| | | |
|---|---|---|
| 3,788,276 | 1/1974 | Propst et al. . |
| 4,288,856 | 8/1981 | Linseth .............................. 119/51.02 X |
| 4,517,923 | 5/1985 | Palmer . |
| 4,589,372 | 5/1985 | Smith ..................................... 604/66 X |
| 4,617,876 | 10/1986 | Hayes ............................... 119/51.02 X |
| 4,712,511 | 12/1987 | Zanzow et al. . |
| 5,069,165 | 12/1991 | Rousseau ......................... 119/51.02 X |
| 5,241,924 | 9/1993 | Lundin et al. ........................ 119/51.02 |
| 5,309,864 | 5/1994 | Harmsen et al. ..................... 119/51.02 |
| 5,355,833 | 10/1994 | Legrain ................................ 119/51.02 |

FOREIGN PATENT DOCUMENTS 2507776  12/1982  France .

*Primary Examiner*—Robert P. Swiatek
*Attorney, Agent, or Firm*—Zarley, McKee, Thomte, Voorhees, & Sease

[57] ABSTRACT

A gestation sow feeding system has a sow bedding enclosure, a gated scale weighing station, an alley connecting the scale weighing station with two separate feeding pens having entry and exist gates, and a bypass gate connecting the alley and the bedding enclosure. The traffic of sows through the system is monitored and controlled by a computer which controls the gates of the system, measures the weight and average daily gain of each sow weighed, and directs the weighed sow to the feeding pen for a ration of feed to permit the sow to adjust to a targeted average daily weight stored in the computer.

10 Claims, 7 Drawing Sheets

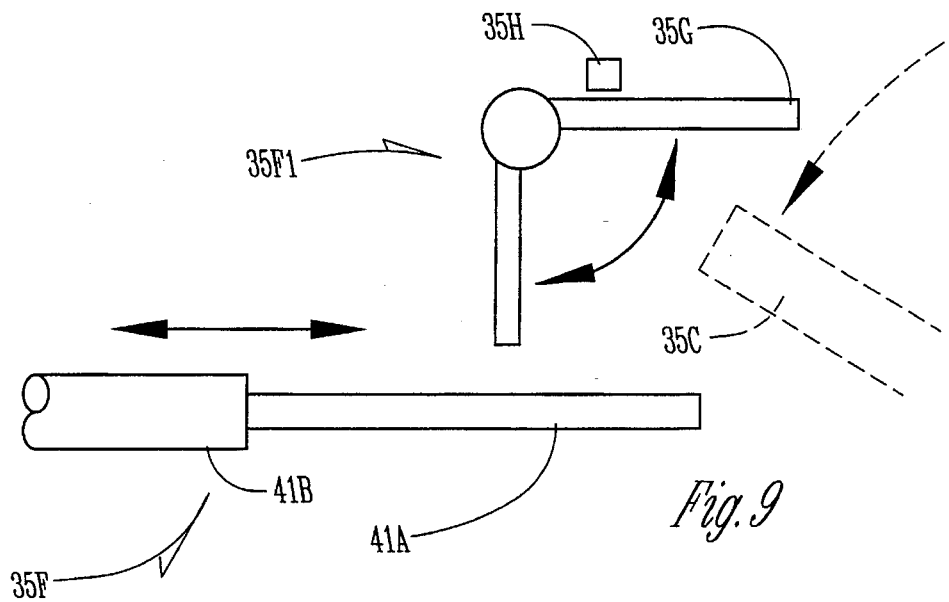
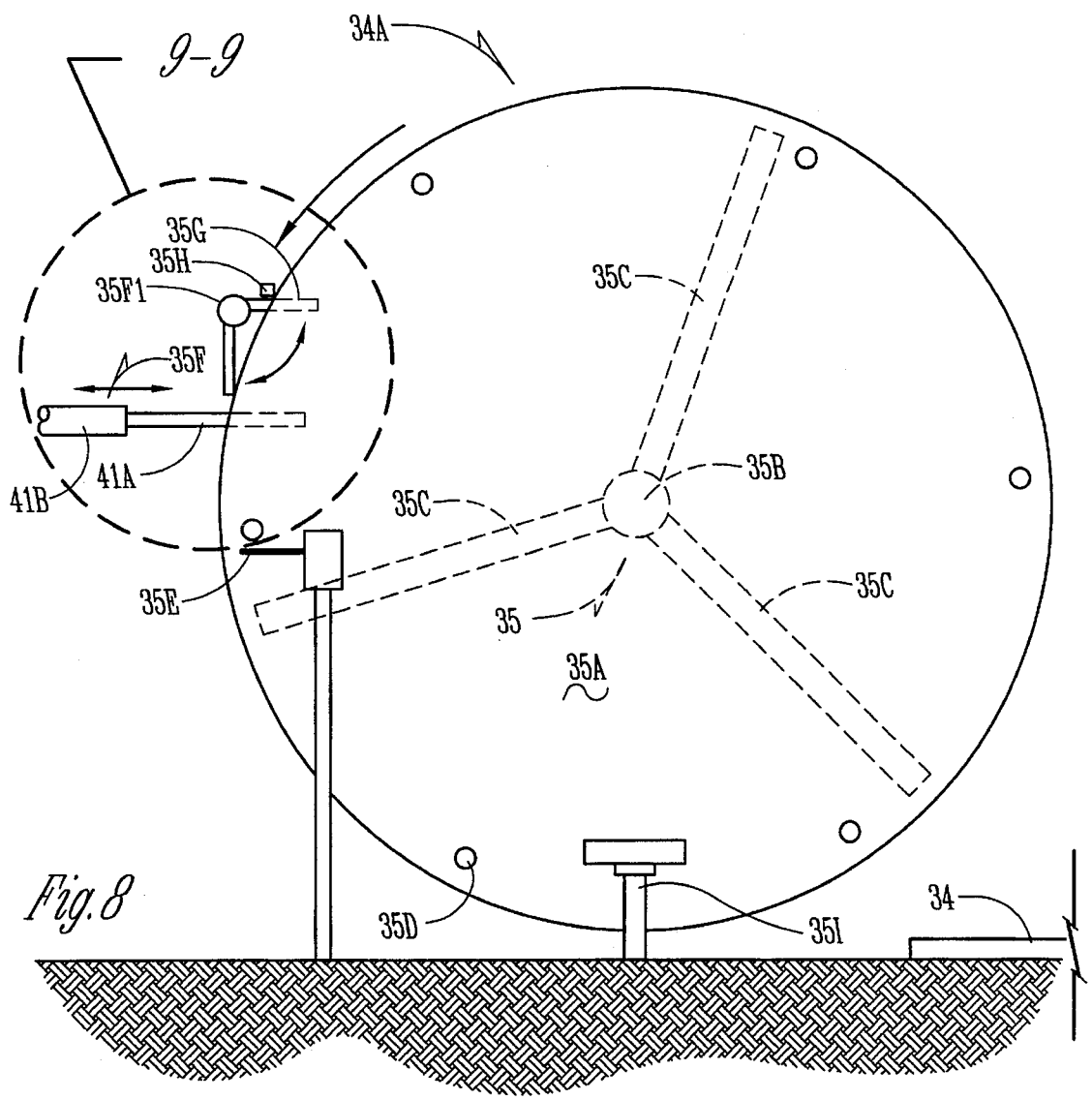

5,579,719

METHOD AND MEANS FOR QUASI AD-LIBITUM FEEDING FOR GESTATION SOWS IN LOOSE HOUSING

BACKGROUND OF THE INVENTION

Gestating sows are commonly placed in gestation crates within confinement buildings which permits each sow to be cared for and fed individual diets. The gestation crates limit the exercise available to the sow which is confined to the crate for much of the gestation period of approximately 114 days. Advantages exist in allowing the sows to exist in loose housing as distinguished from the confinement of gestation crates. Loose housing permits greater exercise for the sow during gestation, and permits the sows to live in social groups. However, loose housing makes it more difficult for each sow to be supplied the required feed ration. It is important to control the weight of the sow during gestation to maximize productivity and to increase sow longevity in the herd.

In response to the need for improved individual feeding of group-housed sows, electronic sow feeding systems began to appear. These feeding systems allow individualized feeding of a set amount of gestation feed to each sow in combination with loose housing. In an electronic sow feeding system, a sow is identified by an electronic transponder or responder on a collar or ear tag as she enters a feeding stall. A transponder emits a signal that is read by an antenna. A responder waits for a signal from an antenna and then responds with the sow's data. After the sow has been identified by the system, a gate closes behind her to keep other sows from entering the feed station. A prescribed amount of feed is provided for the sow to eat in the privacy of the feeding stall. After eating, the sow exits out the stall returning to the rest of the group and the station is ready for another sow. A computer system keeps track of the sow visits to the feed station, and the feed consumed. Electronic sow feeding systems were developed from systems used to feed dairy cattle as individuals. These sow feeding systems demonstrate relatively new technology and are not in extensive use within the U.S.A.

One characteristic of these systems is that limited amounts of feed are supplied to each sow daily. This characteristic leads to sows who are not satiated and are aggressive toward pen mates even though their nutrient needs have been met. By feeding a bulky ration which meets their nutrient requirements great satiety can be achieved. The use of weight gain to control nutrient intake permits a more welfare-friendly feeding system and can utilize lower value feed ingredients.

It is therefore an object of this invention to provide a quasi ad-libitum electronic feeding system which will provide a sow her proper ration as determined by measurements of average daily gains while meeting her need for satiety through use of bulk ingredients.

It is a further object of this invention to provide a quasi ad-libitum electronic feeding system which will permit a plurality of gestating sows to be electronically measured (weight and average daily gain) and electronically controlled for access to one of two predetermined rations.

It is a further object of this invention to provide a quasi ad-libitum electronic feeding system which will permit a group of gestation sows to be continuously monitored by computer technology to assimilate and store data on each sow's growth rate, dietary intake and other production parameters.

These and other objects will be apparent to those skilled in the art.

SUMMARY OF THE INVENTION

A gestation sow feeding system combines electronic identification of the sows, animal weighing, and computer analysis of the sow's current average daily gain in comparison with a target average daily gain, and self-feeding of small groups of sows at the same time in selected feeding pens having different fixed rations, with traffic through the system being monitored and controlled by a computer.

BRIEF DESCRIPTION OF THE DRAWINGS

FIG. 8 is a side elevational view of the staging wheel gate; and

FIG. 9 is an enlarged scale of the portion of FIG. 8 encompassed by line 9—9 on FIG. 8.

DESCRIPTION OF THE PREFERRED EMBODIMENT

Figure 1:
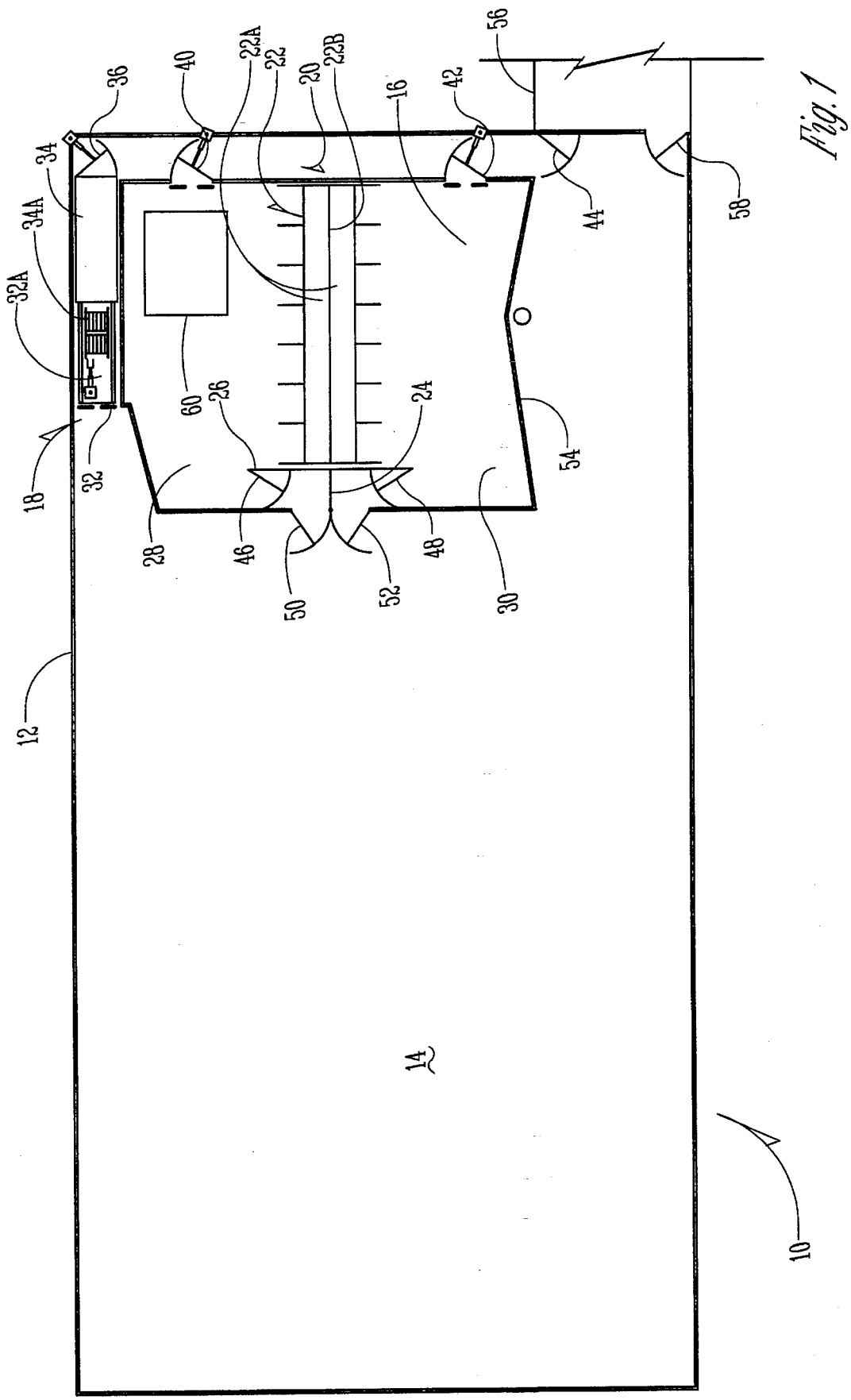
FIG. 1 is a plan view of the building and feeding system layout.
Figure 1A:
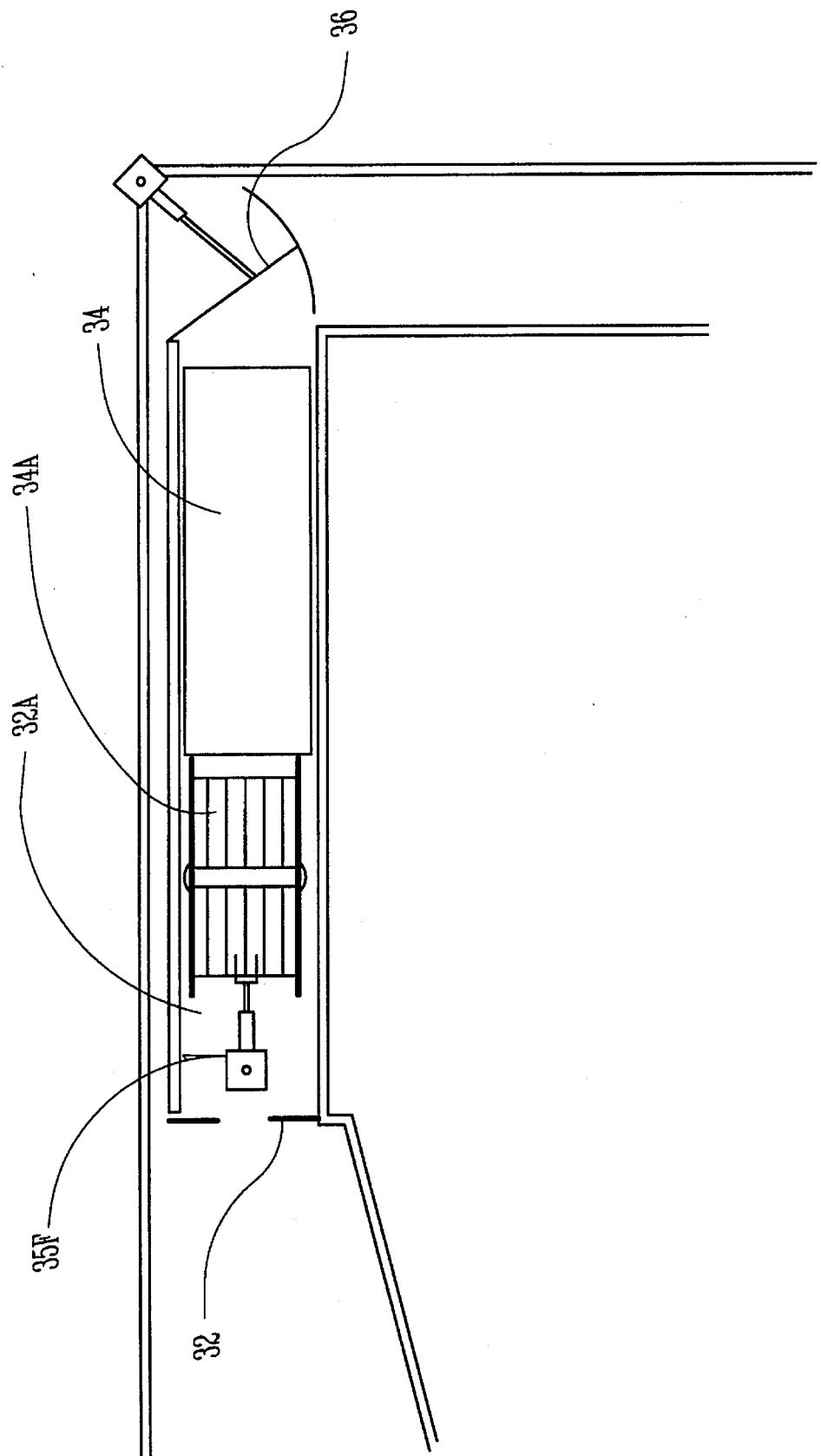
FIG. 1A is an enlarged scale portion of FIG. 1 showing the scale area.

The numeral 10 designates a sow feeding enclosure which preferably has a rectangular shape and typically would have a horizontal length as viewed in FIG. 1 in the order of 19 meters and a width in the order of 9 meters. The sow feeding enclosure 10 is preferably surrounded by a perimeter concrete wall 12 which typically would have a height in the order of 1.1 meters. The numeral 14 designates the bedded area for a plurality of sows. Area 14 preferably has a concrete floor.

The numeral 16 designates a feed area which has a concrete floor. An alley 18 is located adjacent the feed area and is in communication with an alley 20 at right angles thereto which runs past the feed area adjacent one of the outside walls of the feeding enclosure.

A conventional two-sided sow feeder 22 extends transversely across the feed area 16 and has centrally locally feeder compartments 22A separated by a centrally located partition 22B so that different types of feed can be located in feeder compartments 22A on opposite sides of partition 22B. A short gate partition 24 extends inwardly into enclosure 10 from one end of feeder 22 in a position generally parallel to partition 22B. Gate partition 26 extends at right angles to partition 22B adjacent to the inner end of feeder 22. The feed compartments 22A on opposite sides of partition 22B are adapted to receive different feed rations as will be discussed hereafter.

The numeral 28 designates a feeding pen on one side of feeder 22 and the numeral 30 designates an opposite feeding pen on the other side of the feeder.

A one-way gate 32 is mounted in the entry end of a staging wheel gate area 32A immediately adjacent livestock scale 34. A staging wheel gate 34A is mounted in scale staging area 32A immediately adjacent scale 34. An exit gate 36 is mounted on the exit end of the scale. The scale 34 is an electronic scale and is encompassed in a conventional enclosure so that an animal is confined on the scale while being weighed.

Entry gates 40 and 42 are located in feeding pens 28 and 30, respectively, adjacent alley 20 so as to permit a sow in the alley to enter one of the pens through one of the gates as will be discussed hereafter. A bypass gate 44 is located at the end of alley 20 beyond feeding pen 30 so as to permit a sow to return to the area 14 in the event that the feeding pen to which it would ordinarily directed is already full of animals.

The numerals 46 and 48 designate exit gates from feeding pens 28 and 30, respectively. Gates 46 and 48 are mounted on the ends of partition 26. A second set of exit gates 50 and 52 are hinged on the ends of perimeter wall 54 and are adapted to close against the outer end of gate partition 24.

The numeral 56 designates a conventional loading dock which is separated from the feeding enclosure 10 by a conventional gate 58.

Figure 4:
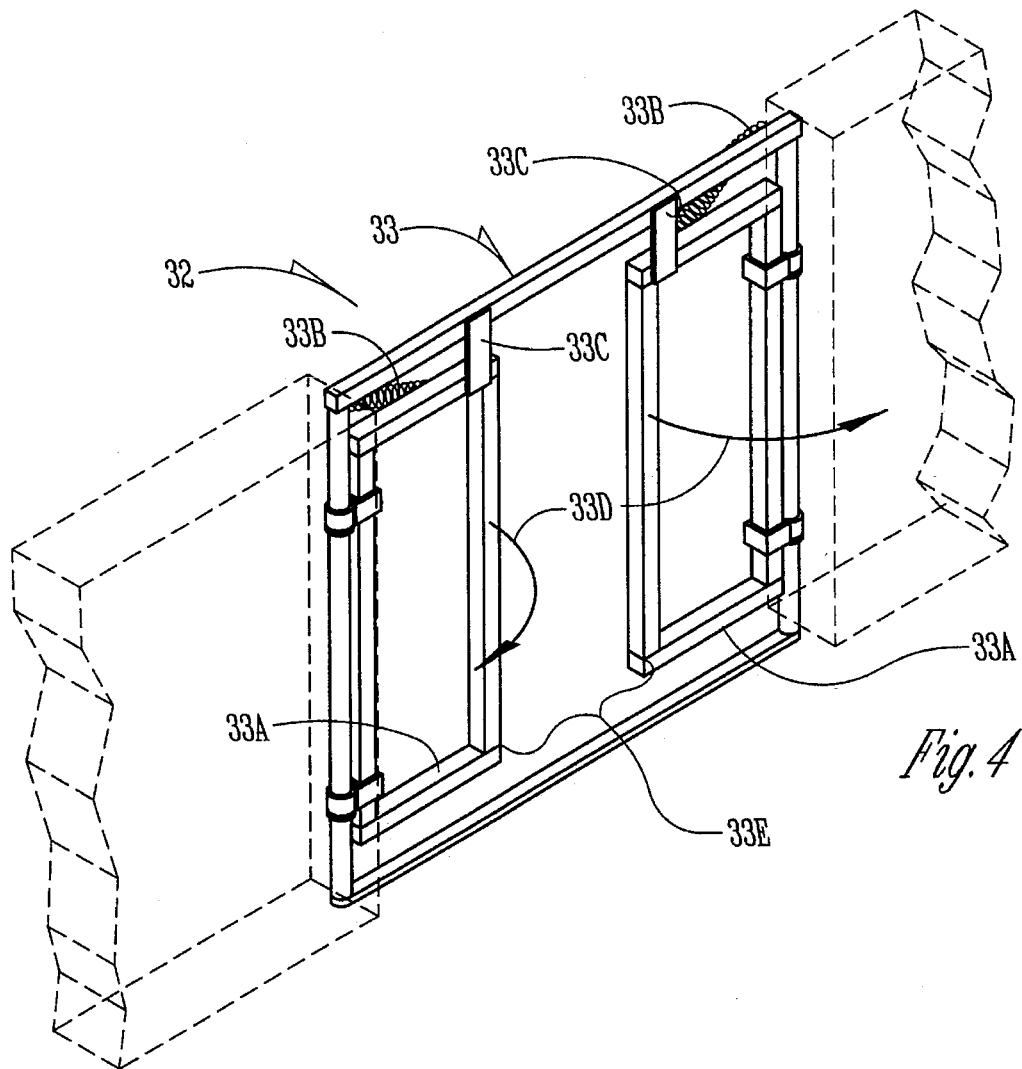
FIG. 4 is a perspective view of a one-way anti-reverse gate.

The traffic control of the sow feeding system of this invention involves the use and operation of a plurality of different gates which have already been generally described. It is preferable that certain of these gates have certain functional capabilities to enhance the use of the feeding system. However, this invention is not limited to the specific construction of any of the gates used therein. Nevertheless, the principal attributes of the key gates in this system will now be described with the belief that gates capable of performing the desired function are well within the knowledge and skill of a person familiar with swine confinement and feeding. Gate 32 is a one-way anti-reverse gate which can be controlled by a computer to be described hereafter. A typical gate 32 is shown in FIG. 4 and a rectangular frame 33 with two small gates 33A hinged on the sides of the frame. Springs 33B convert gates 33A and frame 33 to hold the gates normally closed against stops 33C. As a sow moves in the direction of arrow 33D through central space 33E, the gates 33A swing open. Once through the gate 32, the sow cannot return through the gate which closes automatically by means of springs 33D. Gates 32 can also be superimposed over ages 40 and 42 of this same construction.

Figure 7:
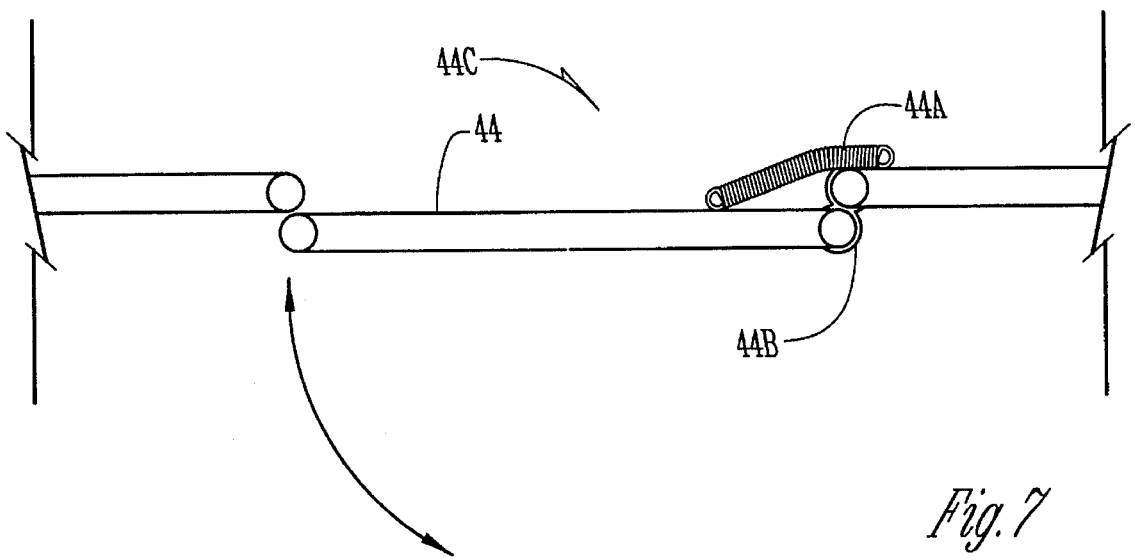
FIG. 7 is a plan view of a one-way gate.
Figure 6:
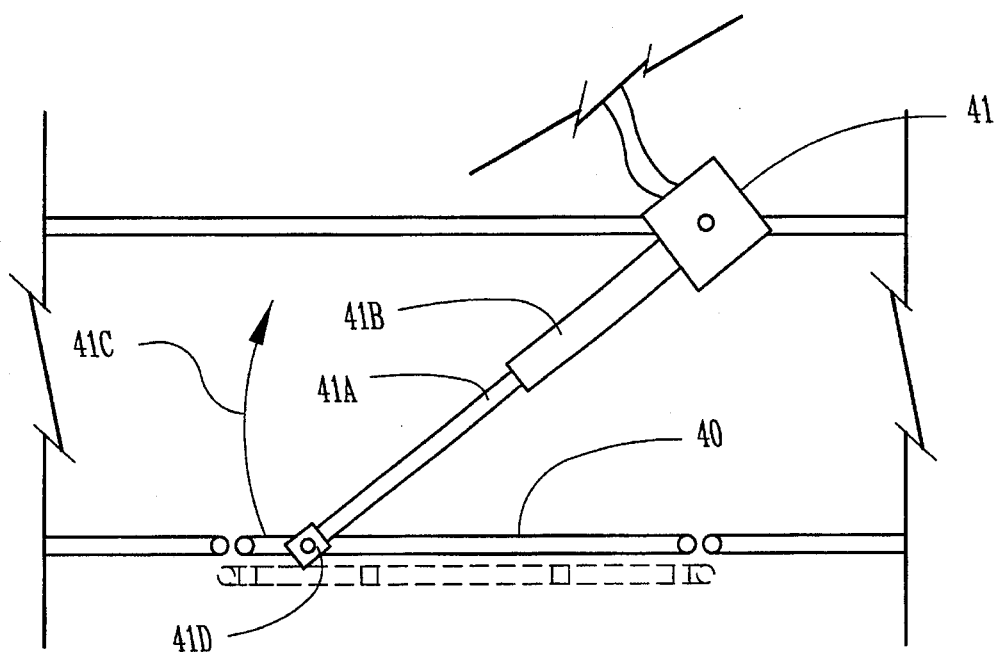
FIG. 6 is a plan view of FIG. 5 showing the gate of FIG. 4 in dotted lines superimposed over the gate of FIG. 5.
Figure 5:
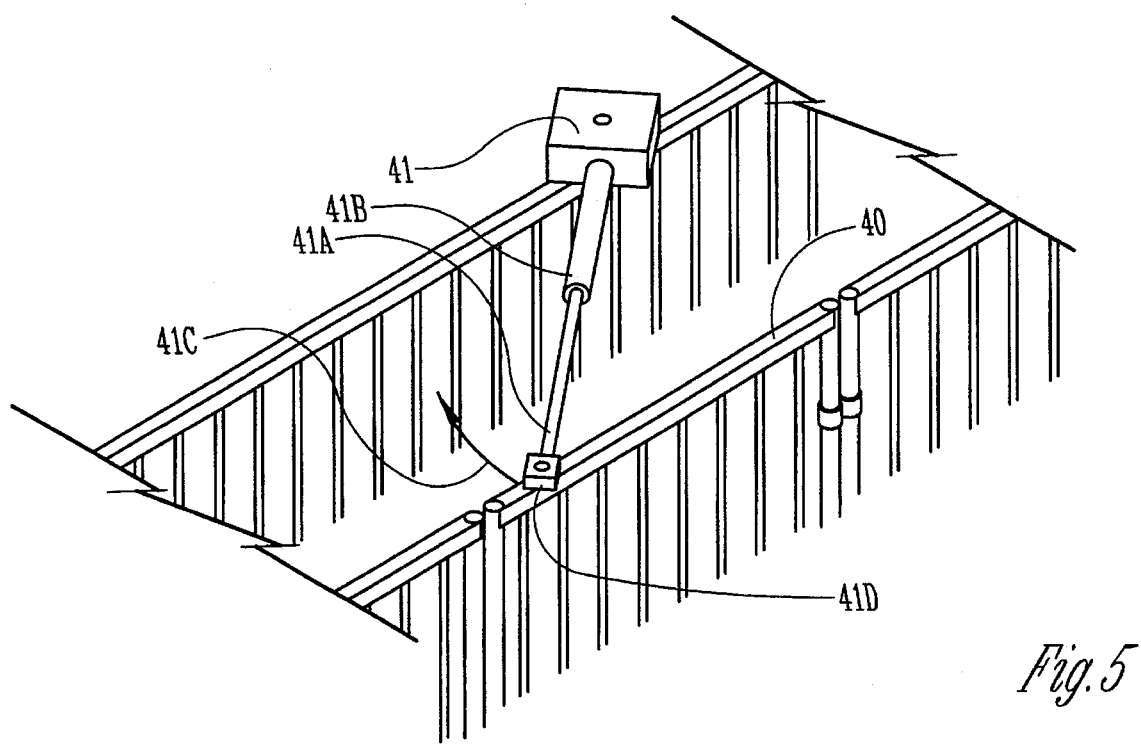
FIG. 5 is a perspective view of a linear actuated gate.

Gates 44 (FIG. 7), 46, 48, 50 and 52 are one-way gates in that they can swing only in an arc of 90° and are normally spring loaded to return to a closed condition whereupon a sow passing therethrough cannot re-enter the gate when it is in its closed condition. Spring 44A on gate 44 pivotally mounted by hinge 44B normally keeps gate 44 resiliently closed against a supporting gate until opened by a sow moving in the direction of arrow 44C (FIG. 7). At least the gates 36, 40, and 42, are computer controlled to be operational only when the computer causes them to be opened or closed. Gates 40, 42, 46 and 48 are sensed by the computer when opened to permit the computer to keep a count on entering (gates 40, 42) or exiting (gates 46, 48) sows. When the computer energized pivotally mounted motor 41 (FIGS. 5 and 6) shaft 41A extends from or retracts into tube 41B to either close gate 40 as shown, or to open the gate in the direction of arrow 41C. The outer end of shaft 41A is pivoted to gate 40 by clevis element 41D.

The scale staging wheel gate 34A can be of the rotatable type and should have the functions of admitting only one sow at a time onto the scale 34. Further, after the gate has admitted one sow to the scale, it has the capability of being locked in a closed condition to prevent entry by another sow and to prevent the sow on the scale from backing off of the scale through the gate. Staging wheel gate 34A is generally shown in FIGS. 8 and 9, and the general functional features are shown. The wheel 35 has spaced circular parallel sides 35A rotatably mounted on shaft 35B. Three gate members 35C extend radially 120° apart from shaft 35B. A sow entering from the left in FIG. 8 will engage one of the gate members 35C and rotate the wheel gate 34A in a counterclockwise direction. As soon as one of the six protruding sensor pins 35D engages computer sensor 35E, the computer extends linear actuator 35F which will block the next appearing rotating gate member 35C (FIG. 9). This stops any further counterclockwise motion of wheel 35 and prevents a second sow from also moving towards scale 34. As the end of a gate engages the shaft 41A (or an appendage thereon), it pivots spring loaded latch 35F1 in a clockwise direction (FIG. 9). Upon clearing latch finger 35G, the latch moves back to the position of FIG. 9 against stop 35H. Finger 35G prevents the wheel 35 from rotating in a clockwise direction, and thereupon prevents a sow on scale 34 from backing rearwardly off of the scale. A pressure wheel brake 35I can be applied against one of the sides 35A to retard the speed of rotation of the wheel which could otherwise rotate at a high velocity if the sow moving through the wheel was moving at an accelerated pace.

Separate bulk feed bins (not shown) are connected by conventional augers or the like to supply feed to one of the two feed compartments 22A in feeder 22.

A computer 60 is shown in FIG. 1 and is mounted in an overhead position and is operatively connected to the various components as described heretofore. The computer 60 has the conventional capability of memory, storage, and calculating capacities. The program for computer 60 will be discussed hereafter.

Quasi ad-libitum means allowing a sow to freely eat but controlling what diet she is eating to regulate sow weight gain. Typical feed for feeder 22 would be pelleted and is typically formulated by using fibrous by-products as the major ingredient. The feeding pens 28 and 30 can accommodate up to seven sows and the feeder 22 has seven feeding spaces on each side.

As previously indicated, the wheel gate 34A has an anti-reverse backstop and a wheel locking system to prevent more than one sow from getting access to the scale for each processing cycle. A sow will be completely on the scale when it is fully through gate 34A. The gates 40 and 42 leading into each feeding pen and the scale exit gate 36 are operated using computer operated linear actuators. Linear actuators for gates 36, 40, 42 and for gate 34A provide movement by a motor driven screw that causes a tube to extend or retract. A one-way gate like gate 32 can also be used inside the entrance to each feeding pen 28 and 30. Two one-way gates 46 and 48 (like gate 44, FIG. 7) prevent the sows from entering the feeding pen through the exit gates.

Figure 2:
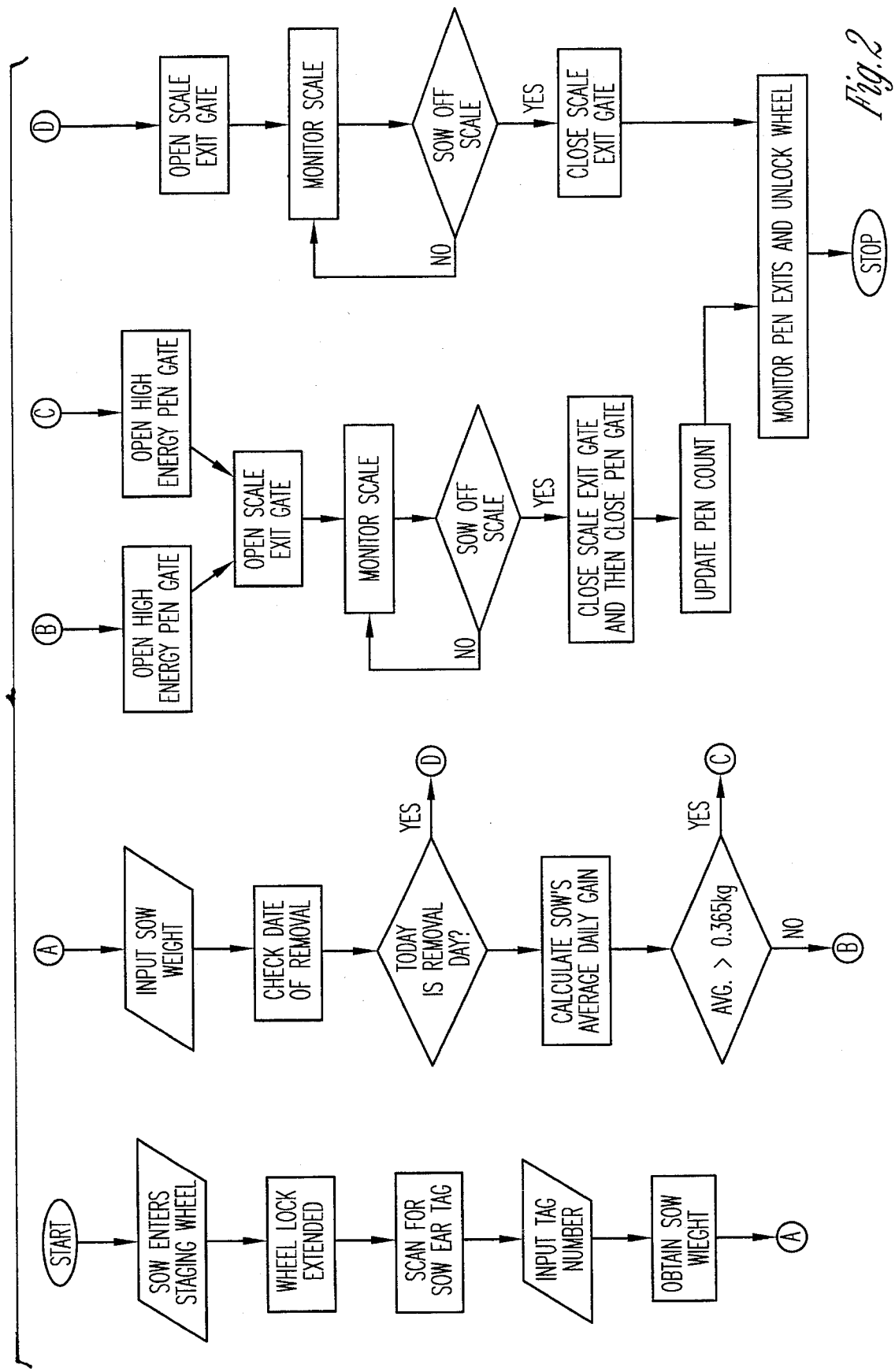
FIG. 2 is a flow chart of logic for the feeding system.
Figure 3:
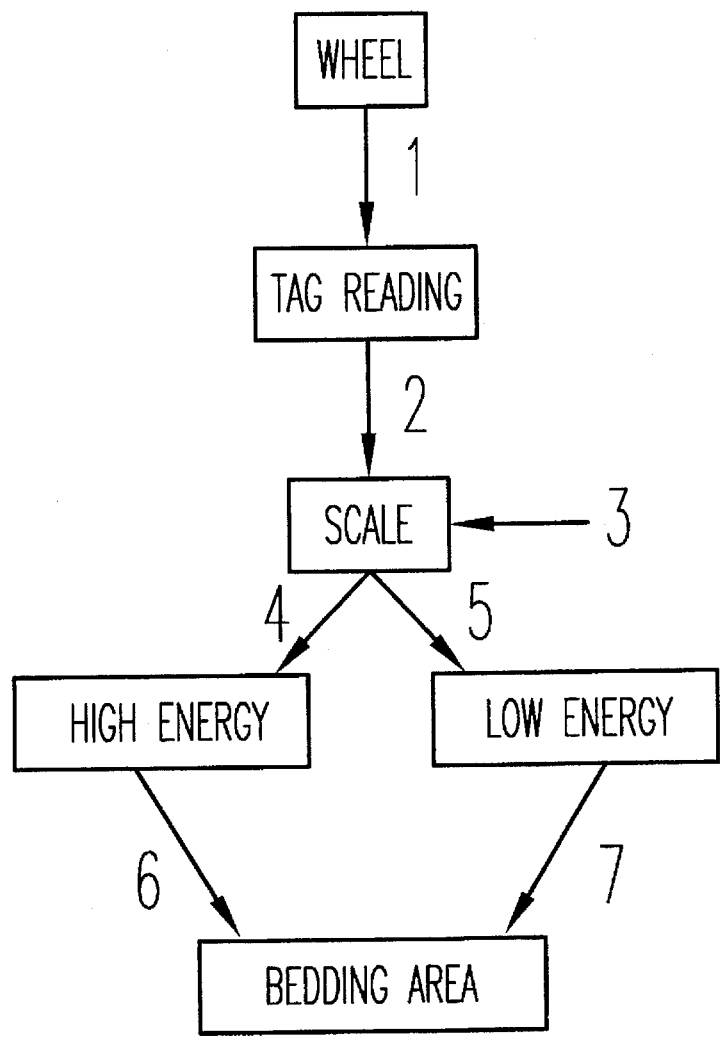
FIG. 3 is a flow chart for timing data.

The logic of the feeding system is shown in FIG. 2. A hungry sow will go through the staging wheel gaining access to the scale. As she spins the staging wheel, a normally open limit switch is tripped signaling to the computer that a sow has entered the system. The computer extends a linear actuator 35F (FIGS. 8 and 9) which acts as a lock for gate wheel 35 to prevent another sow from getting to the scale. Next, the computer begins scanning for the sow's responder tag number. The sow must be completely on the scale for the tag (which is on her right ear) to be read by the computer.

Once her tag number has been read, the computer measures her weight by communicating with the scale. With the sow identified and her current weight recorded, the average daily gain for this sow is computed using the last three daily weights. If her average daily gain is greater than desired, she will be directed to a low ration pen. If her average daily gain is less than desired, she will be directed to a high ration pen.

JDW(JD−1)=sow weight on previous day (kg)

JDW(JD−2)=sow weight two days prior (kg)

JDW(JD−3)=sow weight three days prior (kg)

The sow's Julian day average weight is compared to the appropriate weight based on the desired weight gain curve in the form:

If JDAW≦ISW+(ADG*(JD−IJD) Go to High Ration

If JDAW>ISW+(ADG*(JD−IJD) Go to Low Ration where;

ISW=sow's weight when started in system (kg)

ADG=desired average daily gain (0.365 kg/day)

JD=current Julian day (days)

IJD=Julian day sow started in system (days)

When the computer has determined which pen the sow needs to be in, the computer begins to set the path for the sow to follow. First the feeding pen gate 40 or 42 is opened using a linear actuator. Then the scale exit gate 36 is similarly opened. While waiting for the sow to leave the scale 34, the computer monitors the weight on the scale. Once the scale reads zero pounds signifying the sow has left, the computer closes the scale exit gate 36. After the scale exit gate 36 is closed, the pen entrance gate will be closed after a set time to allow the sow time to reach the correct pen. With the sow in her correct pen, the computer updates all data files, increases the count of sows in that pen and then unlocks the staging wheel 34 by actuator 35F and another sow can go through the system via gate 32. While the computer is operating, it monitors the exit gates 46 and 48 on the feeding pens which have normally closed limit switches. When a sow exits the feeding pen to go back to the bedding area, the switch is opened and computer is signaled to decrease the sow count in that pen by one sow. If a sow needs to be directed to a pen that is already full, the computer will open the scale exit gate 36 without opening a pen gate. The sow will exit out the bypass gate 44 to return to the bedded area 14.

An IBM computer is the central processing unit and utilizes a Quick BASIC program for the operation of the feeding system. Sow tags are identified by a Texas Instruments Registration and Identification System (TIRIS™) tag reader. The reader operates by emitting a radio signal through an antenna to excite the responder in the ear tag. The responder returns a signal to the antenna giving the sow's identification. Sow weight is obtained using an ALL-FLEX™ livestock scale 34 that is able to communicate with the computer through a serial port. A plug-in data acquisition board from Industrial Computer Source aids in data collection and system control. Limit switches are used to detect a sow entering the system or leaving a feeding area. A limit switch is an electrical switch that completes an electrical circuit when closed but breaks the circuit when opened. A normally open switch is used to detect a sow coming through the staging wheel 34A. Normally closed switches on gates 46 and 48 are used to detect a sow leaving a feeding area. As indicated, linear actuators with solid state relay controls capable of forward and reverse motion operate gates 36, 40 and 42. Actuator 35F locks wheel 35 in the manner described so that only one sow is allowed on the scale.

Power for the computer, scale and tag reader are provided by a conventional outlet strip behind the keyboard of the computer. The computer and monitor will automatically be turned on when the power strip is turned on. Power to the scale and tag reader must be turned on using the conventional on/off switches on each piece of equipment.

The computer software to operate this system is set forth below.

Starting the SOW Software:
    When the computer is turned on the following prompt will be shown:

C:\>    (This is called the C prompt.)

The SOW program is in a directory on the C drive called SOWS. To get to this directory type 'cd\sows' at the C prompt and press Return. (To get back to the C prompt type 'cd\' and then Return.)

C:\>cd\sows    <Return>

The computer will display the following prompt stating that you are in the sows directory on the C drive.

C:\SOWS>

To run the SOW program type 'sow9' and then press Return.

C:\SOWS>sow9    <Return>

A screen of information about the software will be displayed for a couple of seconds and then the following menu will be displayed.

MAIN MENU

1. Normal Operation
                    2. Add Incoming Sows
                    3. Remove Exiting Sows
                    4. Program Tags
                    5. View Sows Specific Data
                    6. Gate Control
                    7. Information Please enter the number of the desired selection.

Type the number of your choice and the computer will automatically start that routine. To exit from the main menu back the C prompt, hold down the Shift key and press 'Q'. The computer will return with the following prompt.

Normal Operation:
   When this option is selected, the computer will ask you to input the number of sows currently in each feeding pen so the software runs correctly. Simply enter a number and press Return. The software is designed to allow up to ten sows in each feeding pen at a time. Now the computer will begin to operate in the normal operation mode and will display the following information.

SOWS AT THE FEEDERS

High Fiber                        Low Fiber
             X                                 X

LAST PROCESSED SOW

Time              Weight              Sow No.
     XX:XX:XX            XXXX.X              XXXXX Press ESC to return to Main Menu XX:XX:XX (current time)

The screen display will be updated every 5 seconds as the computer monitors the gates but will not be updated when the computer is processing a sow. Escaping to the main menu is disabled while a sow is being processed.

-Correcting the Sow Count at the Feeders:
   If the incorrect number of sows in a feeding pen is displayed by the computer while in the monitoring stage, press ESC to return to the main menu and press '1' for Normal Operation. When prompted, input the correct sow count and the computer will resume its operation.

Computer Lock Up:
   If the computer locks up trying to process a sow when there is no sow on the scale, the sow is not in the system, or the sow has lost her transponder tag, the computer must be rebooted by pressing Crtl Alt Del simultaneously. The computer will return to the C prompt.

Add Incoming Sows:
   When new sows are added to the group, use this option to put these new sows on file for the computer before resuming normal operation. The computer will immediately begin to prompt you for information about a new sow. Enter the requested information and press Return at each prompt. The following information is required.

New Sow Information

Sow No.: *
Breeding Date(Julian Days):
Accepted Final Weight:
Initial Julian Day:
Removal Julian Days:

* This is the five digit number on the transponder ear tag and is also the five right most digits read by the hand held tag reader.

The computer will print directions on the bottom of the screen stating what to do after entering the data for a sow.

Remove Exiting Sows:
Selecting this option will direct the computer to check the data files to see if any sows are due to be removed by comparing removal dates to the current Julian Day.

Progam Tags:
This option is not yet available

View Sows Specific Data:
This option will allow you to look at certain data about each sow as compiled by the computer. It is possible to look at an individual sow or the whole group. The following information is displayed.

SOW DATA

| | Arrival | | Today | | | | Removal | |
|---|---|---|---|---|---|---|---|---|
| Sow No. | Date | Weight | Hi | Lo | Total | Weight | Date | Weight |

The computer will give instructions at the bottom of the screen as to what key strokes perform which commands.

Gate Control:
This option enables the operator to control specific linear actuators as needed. The computer will display a menu listing the commands which cause each actuator to extend or retract.

Gate Control Menu

| Action | Command |
|---|---|
| Open wheel lock | 0 |
| Close wheel lock | 1 |

```
Open scale exit gate              2
Close scale exit gate             3
Open high protein entrance gate   4
Close high protein entrance gate  5
Open low protein entrance gate    6
Close low protein entrance gate   7
Return to the main menu           M
```

Enter the desired command:

To extend or retract an actuator press the required command and then WAIT for the command to be completed BEFORE initiating another command. When the operator is ready to return to the main menu, the computer will ask if the actuators are to remain in the current position. A positive response will return to the main menu with the actuators in the position the operator set them. A negative response will direct the computer to reset the actuators so the system is ready for normal operation.

Typically, each evening between 11:30 PM and 12:30 AM, the computer creates two files summarizing the sow activities of that day. The first file created lists the sows that went through the system and the date of the activity. The second file lists the sows that did not go through the system for that day and has a title similar to the first file except with a notation such as CHK to indicate that they were not processed.

The amount of time required for sows to make a complete cycle through the feeding system varies. It usually will take about 40 seconds for a sow to move through wheel 34A to load the scale whereupon the sow's identification tag is read. The range of time required for sows to exit the scale and enter the feeding pen is a reflection of variable ability in sow behavior and desire for feed. The average total time that a sow spends in a feeding pen will usually be about 30 minutes.

To avoid computer lockup because of a false trip caused by a delay at gate 34A or a sow that has no tag, a timer (not shown) can be incorporated into the tag reading portion of the software to check the scale after five minutes. If a sow is on the scale, the exit gate opens, and the sow is directed out the bypass gate 44, and the system then resets so another sow can be processed. If no sow is on the scale, the system simply resets itself. The following table shows sow timing results using this system:

TABLE 1

| PROCESS | STAGE | TIMING RESULTS (IN SECONDS) | | |
| --- | --- | --- | --- | --- |
| | | AVERAGE TIME | MAXIMUM TIME | MINIMUM TIME |
| 1 | START THROUGH WHEEL AND FULLY LOAD SCALE | 46 | 195 | 4 |
| 2 | FULLY ON SCALE AND TAG IS READ | 39 | 180 | 3 |
| 3 | EXIT THE SCALE ONCE SCALE GATE IS OPENED | 9 | 55 | 0 |
| 4 | OFF THE SCALE AND INTO THE HIGH RATION PEN | 15 | 45 | 3 |
| 5 | OFF THE SCALE AND INTO THE LOW RATION PEN | 25 | 50 | 6 |
| 6 | TIME SPENT IN THE HIGH RATION PEN | 1591 | 6660 | 60 |
| 7 | TIME SPENT IN THE LOW RATION PEN | 2196 | 6300 | 120 |
| HR | TOTAL TIME IN SYSTEM IF SENT TO HIGH RATION | 1687 | 6761 | 106 |
| LR | TOTAL TIME IN SYSTEM IF SENT TO LOW RATION | 2334 | 6412 | 222 |

From the foregoing it is seen that this invention will accomplish all of its stated objectives.

What is claimed is:

1. The method of feeding gestation sows, comprising, computing the historical average daily gain of a sow based upon historical weight data on said sow, and storing said average daily gain in a computer, weighing said sow prior to feeding and transmitting the weight of said sow to said computer, computing the current average daily gain of said sow from the measured weight of said sow and said historical average daily gain, comparing said current average daily gain of said sow with a target average daily gain to determine if said current average daily gain is higher or lower than said target average daily gain, and directing said sow to a first source of high-energy ration feed or to a second source of low-energy ration feed depending on whether said current average daily gain is lower or higher, respectively, than said target average daily gain.

2. The method of claim 1 where a computer scannable identification element is placed on said sow, computer scanning said sow while said sow is being weighed so that the weight of said sow can be used by said computer to compute said current average daily gain by using said historical weight data.

3. The method of claim 1 wherein said computer includes stored data on said sow including said historical weight data and said target average daily gain.

4. The method of claim 1 wherein said computer is operatively connected to animal traffic control components to release said sow from a weighing station for direction to said first or second source of high or low-energy ration feed.

5. A feeding system for gestation sows, comprising, an animal scale operatively connected to a computer, sensing means associated with said computer to scan an animal identification element on a sow on said scale to identify said sow, said computer having memory storage including previously computed average daily gains on a plurality of sows, and a target average daily gain for each sow, means on said computer joining said scanning means, said scale, and said memory means to connect the identification of said sow, its weight, and its previously computed average daily gain, means on said computer to determine the current average daily gain of a sow on said scale based on the weight of said sow and said previously computed average daily gain, and control means on said computer connected to said scale and two sources of different feed so that a sow being weighed can be directed to one source or the other depending on whether its current average daily gain is higher or lower than said target average daily gain.

6. The system of claim 1 wherein said system includes a scale pen, and first and second feed pens for said first and second sources of feed, respectively, said feed pens and said scale pen each having control gates thereon, said control gates being operatively connected to said computer so that a control gate on said scale will be opened upon completion of the weighing of a first sow, and a control gate on one of said feed pens will be opened to permit said first sow to enter said one feed pen through its open control gate.

7. The system of claim 6 wherein said computer has means to sense the passage of said first sow through said opened control gates, and means to close said opened control gates after said first sow passes therethrough.

8. The system of claim 7 wherein said feed pens and said scale pen have entry and exit control gates operatively connected to said computer whereby the entry gate on said scale pen will open after an entry gate on a feed pen has closed.

9. The system of claim 8 wherein said feed pens have a predetermined maximum capacity for a predetermined number of sows, counter means on said computer connected to said control gates to add the number of sows entering said pens and to subtract the number of sows exiting said pens.

10. The system of claim 9 wherein a bypass control gate is located in an alley connecting said scale pen and said feed pens whereupon said bypass control gate is opened if the computer senses that the feed pen towards which a sow is directed from said scale pen contains a maximum capacity of sows.

* * * * *